United States Patent Office 3,413,394
Patented Nov. 26, 1968

3,413,394
PROCESS OF PREPARING SHAPED
POLYMERIC ARTICLES
Thomas F. Jordan, West Chester, Pa., assignor to E. I. du
Pont de Nemours and Company, Wilmington, Del., a
corporation of Delaware
No Drawing. Continuation-in-part of application Ser. No.
376,255, June 18, 1964. This application Feb. 16, 1965,
Ser. No. 433,205
3 Claims. (Cl. 264—126)

ABSTRACT OF THE DISCLOSURE

A process for coalescing powders of aromatic polyimides and other essentially linear polymeric resins having second order transition temperatures above 250° C. by subjecting said powders to a compressive force of at least 10,000 p.s.i. while maintaining the temperature of the resin between room temperature and the temperature at which the resin will coalesce at the applied pressure. After releasing the pressure, the resin powder is then heated in the substantial absence of pressure to coalesce the powder into a high strength article.

---

This application is a continuation-in-part of my copending application Ser. No. 376,255, filed June 18, 1964, and now abandoned.

The present invention relates to a method of preparing shaped articles formed of high molecular weight organic polymers and, more particularly, to shaped articles capable of being heat-treated to develop high tensile strength and formed of essentially linear polymeric resins having a second order transition temperature above 250° C. and a room temperature modulus above 300,000 lbs./sq. in.

The class of resins characterized as essentially linear polymeric resins having a second order transition temperature above 250° C. and a room temperature modulus above 300,000 lbs./sq. in. includes aromatic polyimides, aromatic polyamides, aromatic polyamide - imides, aromatic polyketones, aromatic polyimines, polybenzotriazoles and aromatic polythiazoles. These polymeric resins are prepared in the form of a powder by procedures such as that set forth in the copending application of Andrew Lazlo Endrey, Ser. No. 169,107, filed Jan. 26, 1962, and now U.S. Patent No. 3,179,631 issued Apr. 20, 1965. The second order transition temperature of such resins is determined by a flexural modulus versus temperature plot. These polymeric resin powders are characterized by having a low crystallinity index, i.e., in the order of 15 to 30 as derived from an X-ray diffractometer scan from resin powder. The crystallinity index is the ratio of coherent intensity arising from the crystalline region to the total coherent intensity arising from the crystalline and amorphous regions in the polymer powder. These resin powders are further characterized by having a high surface area, at least 0.5 sq. meter gram, usually above 1, and preferably from 2 to 500 sq. meters per gram, as measured using the technique described by F. E. Nelsen and F. T. Eggerton, Analytical Chemistry, vol. 30, 1387 (1958). Such powders can be coalesced into shaped articles which display outstanding physical and chemical properties, especially resistance to thermal degradation. These resins exhibit a tendency to degrade well below their crystalline melting points and thus cannot be fabricated in the molten state.

Heretofore, shaped articles have been manufactured from these essentially linear polymeric resin powders by coalescing the powders into a shaped form utilizing a combination of heat and pressure. It has heretofore been found necessary to utilize pressure of from 3,000 to 30,000 p.s.i. while simultaneously employing temperatures in excess of 300° C. These temperatures and pressures had to be maintained upon the article being formed for a considerable period of time. It may be seen that the shaped articles produced by such a process were limited by the practical mold size since the temperature and pressure had to be maintained upon the powder for a considerable period of time. Thus, such articles as a continuous length of sheet could not be prepared by this process. Further, since complete coalescence took place under such conditions of pressure and temperature, it was not possible to reclaim material which was imperfectly molded. Further, because of the high pressure involved during coalescence, it was not possible by the heretofore known process to prepare laminated articles incorporating a pressure deformable element.

It is therefore an object of the present invention to prepare a shaped article of an essential linear particulate polymeric resin having a second order transition temperature of at least 250° C. and a room temperature modulus of at least 300,000 p.s.i., capable of being subsequently heat-treated to develop high tensile strength at room temperature, but which might be reclaimed and reprocessed while in the shape form, and which might be laminated to a pressure deformable material.

It has been found in accordance with the present invention that a shaped article having the desired ultimate density and capable of being heat-treated to develop a tensile strength at room temperature in excess of 8,000 p.s.i., may be prepared by subjecting the particulate form of an essentially linear polymeric resin having a second order transition temperature in excess of 250° C. and a room temperature modulus in excess of 300,000 p.s.i. to a pressure of from 10,000 to 100,000 p.s.i., and a temperature from room temperature to about 250° C. Higher temperatures (up to 400° C.) may be employed if desired. At temperatures in excess of 400° C., however, the polymer particles will show a marked tendency to coalesce.

Various fillers may be admixed with the particulate essentially linear resins to vary such properties thereof as the cooling, lubricating and abrasive properties and the like. Such fillers include: silicon carbide, molybdenum disulfide, cryolite, particulate polytetrafluoroethylene resin, boron nitride, iron sulfide, sodium chloride, asbestos, clay, mica, vermiculite, metal carbides, kaolin, metal oxides, mixtures thereof and the like.

In the practice of the present invention a non-coalesced shaped article is prepared by subjecting a finely divided essentially linear polymeric resin having a second order transition temperature in excess of 250° C. and a room temperature modulus in excess of 300,000 p.s.i. to a compressive force sufficient to compact the finely divided resin into a shaped article having a density approximating ($\pm 3\%$) that of the final coalesced article. The compressive force required to effect such a density will vary with the particular essentially linear polymeric resin employed because the apparent viscosity of such resins varies within a range of $1 \times 10^6$ to $2 \times 10^{12}$ poises at a temperature of from 250° C. to 500° C. as determined by standard long term deformation under load studies. Thus, in the practice of the present invention the compressive force required will be in the range of from about 10,000 to 100,000 p.s.i. It will be apparent to those skilled in the art that a resin having a low apparent viscosity, i.e., $1 \times 10^6$ poises, will not require as high a compressive force to achieve maximum density as will a resin having a higher apparent viscosity.

The compressive force required to achieve a dense shaped article may be supplied by means of a rolling mill or by means of pressure applied to a finely divided resin confined within a mold. The resultant shaped article, after being subjected to the compresive force, may be machined, postformed, or otherwise treated to produce the desired characteristics of the ultimate finished article. At this time imperfect moldings can be discovered and the material recycled through the process resulting in a savings in material. The compacted shaped article can then be heat-treated or sintered in an inert atmosphere, without the use of pressure, for a period of about 5 to 20 minutes to achieve ultimate tensile strength at room temperature in the range of at least 8,000 p.s.i. The pressures employed in the compaction are critical since the density of the coalesced article will be essentially the same as the density of the compacted preform. If insufficient pressure is applied during the compaction step coalescence will not take place upon subsequent heat treatment and the resultant article will lack useful properties such as high tensile strength.

The invention of the present application is further illustrated by the following examples which are intended to be merely illustrative and not limiting.

The following tests were employed in the determination of the properties of the noncoalesced article and the subsequent heat-treated (sintered) article.

Hardness measurements were obtained utilizing a Scleroscope and are based on the Shore Scale using a universal diamond hardness standard.

Strength index is a measurement of the force in p.s.i. required to break a uniform chip divided by the thickness of the chip in mils. This measurement is determined by placing a test specimen across a circular support having an $11/16$ in. slot located therein. The test specimen is loaded by a triangular cross section bar slightly longer than the diameter of the test specimen with the contact edge having a radius of $1/32$ in. The load is applied slowly until the specimen fails and breaks. The bar is driven by a 4 in. diameter Meade air clamp.

EXAMPLE I

A cylindrical mold having an internal diameter of 1¼ inches was filled with three grams of a powder of an essentially linear aromatic polyimide resin having a second order transition temperature above 500° C. and a room temperature modulus of 440,000 p.s.i. prepared by reacting 4,4'-oxydianiline with pyromellitic dianhydride according to the procedures set forth in copending application Ser. No. 169,107, filed Jan 26, 1962. A matching punch was brought to rest on the powder in the mold cavity without exerting pressure on the powder. The mold and its contents were heated to about 300° C. This temperature was maintained for a period of about 10 minutes. A hydraulic press was then employed to apply a load of 40,000 lbs. (corresponding to a pressure of 32,500 p.s.i.) to the mold contents. The pressure was maintained for a period of about 2 minutes. The resultant disk-shaped article was then ejected from the mold. This article could readily be cut or shaped. The density of the compacted, noncoalesced article was found to be between 1.415 and 1.418 gms./cm.³. Its hardness, as determined by a Scleroscope was found to be 92. The strength index of the article was 0.09.

The disk-shaped article was then placed in a vacuum oven (having a vacuum of 25 inches of mercury). The oven had been preheated to a temperature of about 450° C. After a period of about 5 minutes the article was removed from the oven and allowed to cool in air to room temperature. The resultant article was a tough polyimide disk having a density of 1.417 gms./cm.³, a tensile strength of 12,400 p.s.i., a tensile elongation of 8.2%, a hardness as determined by a Scleroscope of 99 and a strength index of 0.28.

EXAMPLE II

The procedure of Example I was repeated utilizing a powder of an essentially linear aromatic polyimide resin having a second order transition temperature of 310° C. and a room temperature modulus in excess of 600,000 p.s.i. prepared by reacting 4,4'-oxydianiline and 3,3',4,4'-benzophenonetetracarboxylic dianhydride according to the procedures set forth in copending application Ser. No. 169,107, filed Jan. 26, 1962. The mold and its contents were heated to about 200° C. The compaction took place for 1 minute with a load of 40,000 lbs. (corresponding to a pressure of 32,500 p.s.i.). The resultant noncoalesced shaped article had a density of 1.3733 gms./cm.³, a hardness as determined by a Scleroscope of 90 and a strength index of 0.083.

The compacted article was then heat-treated according to the procedures of Example I at a temperature of 400° C. for a period of 10 minutes. The resultant article was a tough polyimide disk having a density of 1.3619 gms./cm.³, a tensile strength of 14,000 p.s.i., a tensile elongation of 9.8%, a hardness as determined by a Scleroscope of 97 and a strength index of 0.32.

EXAMPLE III

The procedure of Example I was repeated utilizing a powder of an essentially linear aromatic polyamide having a second order transition temperature above 250° C. and a room temperature modulus above 300,000 p.s.i. prepared according to the following procedure.

A solution of 6.50 g. of p-phenylenediamine and 4.00 g. 4,4'-oxydianiline in 240 ml. tetrahydrofuran (3 to 1 mole ratio of diamines) was prepared in a Waring Blendor and to it was added a solution of 16.96 g. anhydrous sodium carbonate in 150 ml. cold water. A solution of 16.41 g. recrystallized isophthaloyl chloride in 160 ml. tetrahydrofuran was then added rapidly to the vigorously stirred solution. Stirring was continued for four minutes after the addition and the product was then separated by filtration and purified by washing twice with water and once with acetone. Following drying in a vacuum oven at 70° C. and a heat treatment under nitrogen for five hours at 290° C., the polymer powder weighed 19.5 g. The polymer dissolved in concentrated sulfuric acid forming a purple solution whose inherent viscosity was 1.36.

The powder was compacted 5 minutes at a temperature of 200° C. under a pressure of 15,000 p.s.i. The resultant noncoalesced article had a density of 1.2179 gms./cm.³, a hardness of 55 and a strength index of 0.08.

The compacted article was then heat-treated for 5 minutes at atmospheric pressure in an inert atmosphere at a temperature of 410° C. The resultant article was a tough polyamide disk having a density of 1.2046 gms./cm.³, a tensile strength of 16,000 p.s.i., a hardness of 105 and a strength index of 0.38.

EXAMPLE IV

The procedure of Example I was repeated utilizing a powder of an aromatic polyimine having a room temperature modulus above 300,000 p.s.i. prepared according to the following procedure.

A stirred solution of 12.214 g. of 3,3'-dimethoxybenzidine (purified by distillation) in 100 ml. of N,N-dimethylacetamide was treated with 6.7068 g. of terephthalaldehyde (recrystallized from tetrahydrofuran) and the mixture was rapidly heated to boiling. As the boiling point was reached, an orange precipitate was formed. The suspension was heated under reflux for 15 minutes before isolation of the polymer by filtration and purification by two acetone washings followed by vacuum drying at 50° C. Finally, the product was heat-treated overnight at 260° C. under nitrogen, yielding 13.6 g. of a reddish powder. The polymer dissolved in concentrated sulfuric acid, forming a very deep reddish-purple solution whose inherent viscosity was 0.29.

The powder was compacted for 5 minutes at 150° C. utilizing a pressure of 15,000 p.s.i. The resultant noncoalesced article had a density of 1.1025 gms./cm.³, a hardness of 33 and a strength index of 0.04.

The compacted article was then heat-treated in an inert atmosphere at atmosphere pressure at 300° C. for a period of 5 minutes. The resultant product was a tough polyimine disk having a density of 1.1043 gms./cm., a hardness of 90, a tensile strength of 8500 p.s.i. and a strength index of 0.15.

I claim:
1. A process of fabricating a shaped article from coalesceable powder of an essentially linear polymeric resin having a second order transition temperature of at least 250° C. selected from the group consisting of aromatic polyimides, aromatic polyamides, aromatic polyamide-imides, and aromatic polyimines which process comprises the steps of:
 (a) subjecting said powder to a pressure of at least 10,000 p.s.i. while maintaining the temperature of the resin at between room temperature and the temperature at which the powder will coalesce under the applied pressure,
 (b) releasing the pressure on the pressed powder, and
 (c) heating the pressed powder to a temperature of at least 400° C. in the substantial absence of applied pressure for from about 5 to about 20 minutes to coalesce said powder into the shaped article.

2. The process of claim 1 wherein the resin is an aromatic polyimide.

3. The process of claim 2 wherein the polyimide powder has a surface area of from about 2 to about 500 square meters per gram.

References Cited
UNITED STATES PATENTS

| | | | |
|---|---|---|---|
| 3,094,511 | 6/1963 | Hill et al. | 260—78 |
| 3,179,614 | 4/1965 | Edwards | 260—78 |
| 3,179,631 | 4/1965 | Endrey | 260—78 |
| 3,179,633 | 4/1965 | Endrey | 260—78 |
| 3,234,181 | 2/1966 | Olivier | 260—78 |
| 3,247,165 | 4/1966 | Rodia | 260—78 |
| 3,249,588 | 5/1966 | Gall | 260—78 |
| 3,263,010 | 7/1966 | Shultz | 264—126 |
| 3,264,250 | 8/1966 | Gall | 260—78 |
| 2,981,979 | 5/1961 | Seefluth | 264—126 |

ROBERT F. WHITE, *Primary Examiner.*

J. R. HALL, *Assistant Examiner.*